(12) United States Patent
Wardle et al.

(10) Patent No.: US 6,350,330 B1
(45) Date of Patent: Feb. 26, 2002

(54) POLY(BUTADIENE)POLY(LACTONE) THERMOPLASTIC BLOCK POLYMERS, METHODS OF MAKING, AND UNCURED HIGH ENERGY COMPOSITIONS CONTAINING SAME AS BINDERS

(75) Inventors: Robert B. Wardle, Logan; Jerald C. Hinshaw, Ogden, both of UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 07/616,964

(22) Filed: Nov. 21, 1990

Related U.S. Application Data

(63) Continuation-in-part of application No. 07/362,900, filed on Jun. 7, 1989, now abandoned.

(51) Int. Cl.$^7$ .......................... C06B 23/00; C06B 45/10; C08F 236/06; C08L 67/06
(52) U.S. Cl. ..................... 149/19.5; 149/19.6; 523/180; 525/186; 525/450; 528/486
(58) Field of Search ............................. 149/19.5, 19.6; 102/291; 523/180; 525/74, 84, 450; 528/486

(56) References Cited

U.S. PATENT DOCUMENTS

| | | | | |
|---|---|---|---|---|
| 3,501,357 A | * | 3/1970 | Suzuki et al. ............... | 149/19.5 |
| 3,585,257 A | * | 6/1971 | Mueller, Jr. et al. ......... | 525/386 |
| 3,652,720 A | * | 3/1972 | Wright .................... | 525/450 X |
| 3,830,675 A | * | 8/1974 | Zelinski et al. ......... | 149/19.5 X |
| 4,360,643 A | * | 11/1982 | Naylor ........................ | 525/386 |
| 4,659,402 A | * | 4/1987 | Comfort ................. | 149/19.5 X |
| 4,853,051 A | * | 8/1989 | Bennett et al. ......... | 149/19.5 X |

FOREIGN PATENT DOCUMENTS

| | | | | |
|---|---|---|---|---|
| EP | 0235741 | * | 9/1987 | 525/386 |
| EP | 0266973 | * | 5/1988 | 525/123 |

* cited by examiner

Primary Examiner—Michael J. Carone

(57) ABSTRACT

A thermoplastic, elastomeric block copolymer comprises at least one poly(butadiene) and at least one pair of poly(lactone) blocks flanking the poly(butadiene) block. Each poly(lactone) block is derived from a lactone having between 8 and 18 carbon atoms in the lactone ring, such as λ-laurolactone and 10-hydroxyl decanoic acid lactone.

Alternative methods of making these block polymers are also disclosed. In the first procedure diethyl zinc reacts with the hydroxyl end group of a butadiene polymer to form an intermediate zinc alkoxide-tipped polybutadiene which functions as the active initiating species. The laurolactone polymer then grows off the hydroxyl end groups of the butadiene to form the desired ABA block copolymer. In another related procedure for making ABA block polymers, previously prepared difunctional hydroxyl-terminated polybutadiene blocks are linked with monofunctional poly(λ-laurolactone) blocks using a diisocyanate and a catalyst. The poly(λ-laurolactone) is prepared from λ-laurolactone, diethyl zinc and a suitable mono-functional alcohol. Another procedure describes the direct linking of hydroxyl-terminated poly(butadiene) with a poly(λ-laurolactone) with a difunctional isocyanate producing a polymeric material having an $(AB)_n$ structure.

Also disclosed are chemically uncured high-energy compositions, such as explosives, gasifiers, and especially solid rocket motor propellants, wherein between about 70–91 wt. % of solid particulates, including fuel material and/or oxidizer, and between about 9–30 wt. % of a binder system comprising a thermoplastic, elastomeric block copolymer system as above described and optionally a plasticizer.

37 Claims, No Drawings

POLY(BUTADIENE)POLY(LACTONE) THERMOPLASTIC BLOCK POLYMERS, METHODS OF MAKING, AND UNCURED HIGH ENERGY COMPOSITIONS CONTAINING SAME AS BINDERS

CROSS REFERENCE TO COPENDING RELATED APPLICATION

This application is a continuation-in-part of applicants' U.S. patent application Ser. No. 07/362,900 filed Jun. 7, 1989. (i.e. now abandoned)

BACKGROUND OF THE INVENTION

1. Field of the Invention

The present invention relates to novel thermoplastic block polymers and methods of making same; and high-energy compositions, such as propellants, explosives, gasifiers, and the like, containing such block polymers therein as binders, which are chemically uncured.

2. Description of the Prior Art

Solid high-energy compositions, such as propellants, explosives, gasifiers, or the liked comprise solid particulates, such as fuel particulates and/or oxidizer particulates, dispersed and immobilized throughout a binder matrix comprising an elastomeric polymer.

Conventional solid composite propellant binders utilize cross-linked elastomers in which prepolymers are cross-linked by chemical curing agents, as typically disclosed in U.S. Pat. No. 4,361,526 and European Patent No. 266,973. As outlined in detail in the referenced U.S. patent there are important disadvantages to using cross-linked elastomers as binders. Cross-linked elastomers must be cast within a short period of time after addition of the curative, which time period is known as the "pot life". Disposal of a cast, cross-linked propellant composition is difficult, except by burning, which poses environmental problems. Furthermore, current state-of-the art propellant compositions have serious problems that include, but are not limited to use of nonenergetic binder, high end-of mix viscosities, toxic isocyanate curatives, thermally labile urethane linkages, and vulnerability to unscheduled detonation.

Although advantages of thermoplastic elastomers relative to cured elastomers for use in high-energy compositions are appreciated by those skilled in the art, particularly for use in rocket motors, there are reasons why one might not rush to substitute thermoplastic elastomers for cured elastomers in specific applications. Rocket motors are expensive to design, test and produce. Typically, a rocket motor is developed to use a particular propellant composition which has certain mechanical and burn characteristics. If a rocket motor design is successful, there is reluctance to make changes, and particularly to make changes with respect to the propellant composition. Furthermore, designers of rocket motors have a great deal of experience with propellant compositions having cast-cured propellant compositions and are less familiar with the characteristics of propellant compositions having thermoplastic binders.

It is believed that high-energy compositions, particularly solid rocket motor propellants, having thermoplastic binders will achieve greater acceptance if they closely approximate the mechanical and burn characteristics of currently used cast-cured propellant compositions. The present invention is particularly directed to propellant compositions which attempt to approximate the mechanical and burn characteristic of poly(butadiene) based cured propellant compositions.

U.S. Pat. Nos. 3,585,9257 and 4,360,643 and European Patent No. 235,741, in general disclose various block polymers, e.g. of butadiene and lactones, and methods of making same, but nowhere suggest using any such block polymer systems as the binder component in high energy composition such as a propellant for a rocket motor.

Polymers derived in the prior art from branched claim lactones such as 6-hydroxy dodecanoic acid lactone (epsilon or $\epsilon$-laurolactone) and 4-hydroxy dodecanoic acid lactone (gamma or $\gamma$-laurolactone), and unsubstituted lactones such as 6-hydroxy hexanoic acid lactone (epsilon or $\epsilon$-caprolactone), are not acceptable for the disclosed utility according to the invention because the melting points of these polymers are below that minimally useful, i.e. less than 70° C.

The methods of making the block polymers as disclosed in these three references are materially different from the methods according to the present invention (particularly as set forth in Examples 1–3 to follow). The lithium, sodium and potassium based methods described therein are not applicable to the preparation of low polydispersity, high molecular weight 12-hydroxy dodecanoic acid lactone (hereinafter $\lambda$-laurolactone) polymers in high conversion. None utilize a zinc counter ion wherein diethyl zinc reacts with the hydroxyl end group of the butadiene polymer to form an intermediate zinc alkoxide-tipped polybutadiene which functions as the active initiating species, as in the present invention. Similarly none link previously prepared difunctional hydroxyl-terminated polybutadiene blocks with monofunctional poly ($\lambda$-laurolactone) blocks using a diisocyanate and a catalyst, as in the present invention.

An earlier parallel effort of applicant with polyoxetanes to form $(AB)_n$ type materials using a similar method is the subject of U.S. Pat. No. 4,806,613. This patented method for oxetanes, wherein each of the two blocks is separately allowed to react with a difunctional isocyanate to form isocyanate capped blocks which are then linked with butanediol, is quite different from the present invention.

SUMMARY OF THE INVENTION

The object of the present invention is to provide novel thermoplastic elastomers and methods of making same; and chemically uncured high-energy compositions, particularly rocket motor propellants, formed therefrom.

The thermoplastic elastomers are block polymers in which the polymer molecules comprise at least one poly (butadiene) block which is amorphous in the range of ambient temperatures and at least one pair of poly(lactone) blocks, which are crystalline at temperatures up to about 70° C. flanking the polybutadiene block. The lactones from which the poly(lactone) blocks are formed contain between 8 and 18 carbon atoms in the lactone ring with no carbon or heteroatom substituents other than hydrogen on the ring.

The poly(lactone) blocks preferably contain between 10 and 18 carbon atoms in the lactone ring, and most preferably between 10 and 12 carbon atoms. The preferred lactones are 10-hydroxy dodecanoic acid lactone and 12-hydroxy dodecanoic acid lactone (lambda or $\lambda$-laurolactone), the latter is most preferred. The derived poly(lactones) are, therefore, linear polyesters without carbon or heteroatom side chains.

According to the present invention two methods of preparing ABA triblock polymers are disclosed. In the first, a zinc counter ion is utilized wherein diethyl zinc reacts with the hydroxyl end group of the hydroxy terminated butadiene polymer to form an intermediate zinc alkoxide-tipped polybutadiene which functions as the active initiating species. The laurolactone polymer grows off the hydroxyl end groups of the butadiene to form the desired ABA block copolymer, producing low polydispersity, high molecular weight λ-laurolactone polymers in high conversion, which characteristics are critically important for the destined end application/utility, i.e. as a binder for high energy propellant compositions. In the second, previously prepared difunctional hydroxyl-terminated polybutadiene blocks are linked with monofunctional poly (λ-laurolactone) blocks using a diisocyanate and a non-metal based catalyst. This technique allows the use of a "building block" approach to the preparation of large numbers of distinct block copolymers from a smaller number of "building blocks" and also circumvents the use of a metal based catalyst in the block polymerization scheme. The poly (λ-laurolactone) is prepared from λ-laurolactone, diethyl zinc and a suitable mono-functional alcohol such as benzyl alcohol.

Also according to the present invention a method of preparing a different class of thermoplastic elastomeric materials with an $(AB)_n$ structure (as opposed to the ABA structures resulting from the two methods aforementioned) is disclosed wherein butadiene and λ-laurolactone are linked or polymerized. By this method the direct linking of a hydroxyl-terminated poly(butadiene) of functionality 2.0 with a poly(λ-laurolactone) also with a functionality of 2.0 with a difunctional isocyanate occurs. This somewhat different technique parallels an earlier effort of applicant with polyoxetanes to form $(AB)_n$ type materials using a similar method which is the subject of U.S. Pat. No. 4,806,613, as aforementioned.

Chemically uncured, high-energy compositions made in accordance with the invention comprised the aforementioned thermoplastic elastomers and high-energy particulates, such as oxidizer particulates and/or fuel materials, e.g. particulates. The uncured high-energy composition may also optionally include a plasticizer, preferably mineral oil, if used.

Other objects and advantages of the present invention will become apparent to those skilled in the art from the following detailed description and appended claims.

DETAILED DESCRIPTION OF CERTAIN PREFERRED EMBODIMENTS

In accordance with the invention, thermoplastic block copolymers are produced in which at least one amorphous poly(butadiene) block is flanked by at least one pair of crystalline poly(lactone) blocks. Such block polymers are suitable for use as binders for high-energy compositions, such as gasifiers, explosives, and particularly propellants. The chemically uncured thermoplastic binder system formed from the block polymers have mechanical and burn properties similar to those using cross-linked (cured) poly (butadiene) as the binder. The poly(butadiene) blocks are amorphous and elastomeric at ambient temperatures, i.e. at 20–25° C. and are preferably amorphous at low temperatures, e.g., down to 40° C. and even down to −60° C. and below. The poly(lactone) blocks, on the other hand, are crystalline at ambient temperatures and remain crystalline to at least 70° C. The melting temperature of the poly(lactone) is such that at temperatures above 70° C. and below 120° C. (preferably below 100° C.) the block copolymer is processable; that is, meltable, easily castable when melted, and thermally cyclable. It is preferred that this temperature be above 70° C. and below 100° C., and most preferably at a temperature of about 80° C. The invention includes block polymers of the $(AB)_n$ (n=2–40) type, the ABA type and $A_nB$ (n=3,4,5) star polymer type, where B is the poly(butadiene) blocks(s) and A blocks are poly (lactone). The lactone monomers from which the poly (lactone) blocks are formed have between 8 and 18 carbon atoms in the lactone ring with no carbon or heteroatom side chains other than hydrogen. Preferably the lactone monomers contain between 10 and 18, and most preferably between 10 and 12, carbon atoms in the lactone ring. Suitable lactones include 10-hydroxy decanoic acid lactone, and λ-laurolactone, the latter being preferred. Mixtures of these two lactones are also suitable.

The preferred method of forming the block copolymers of the invention is to separately form the poly(butadiene) blocks and the poly(lactone) blocks and then join the blocks. For example, hydroxyl-terminated poly(butadiene) (HTPB) may be joined to hydroxyl-terminated poly(lactone) blocks with a diisocyanate. Alternatively, as described in U.S. Pat. No. 4,806,613 issued Feb. 21, 1989 to Robert Wardle, the teachings of which are incorporated herein by reference, the polymer blocks might each be capped with a diisocyanate and subsequently connected with a short-chain diol. A less preferred method of forming block polymers in accordance with the invention is to provide a HTPB block and polymerizing a lactone from the hydroxyl termini of the HTPB block.

The poly(butadiene) blocks(s) provides the elasticity of the thermoplastic elastomeric copolymer. The poly (butadiene) block is selected to be amorphous throughout the temperature range to which a high-energy composition is expected to be exposed. For various propellant applications this may be down to about −40° C. or even −60° C. and below. On the other hand, the poly(lactone) blocks, which provide rigidity to the thermoplastic elastomer, are expected to remain crystalline throughout the temperature range to which the high-energy composition might be proposed. Generally, it is considered that propellants may be exposed to temperatures up to 60° C., and herein, poly(lactone) blocks are selected so that the thermoplastic elastomeric block copolymer does not become mobile until at least about 70° C. Because of the presence of high-energy particulates, particularly high-energy oxidizer particulates, the block copolymer should be processable below about 120° C. preferably below about 100° C. and most preferably at about 80° C. Suitable lactone monomers for forming block copolymers which are processable at the appropriate temperature ranges have between 8 and 18 carbon atoms in the lactone ring with no carbon or heteroatom side chains other than hydrogen. The lactone preferably contains between 10 and 18, and most preferably between 10 and 12, carbon atoms in the lactone ring. Specifically the lactones most suitable for forming the poly(lactone) blocks in accordance with the present invention include 10-hydroxy decanoic acid lactone (structure I), lambda or λ-laurolactone (Structure II) and mixtures thereof. The most preferred poly(lactone) blocks are homopolymers of λ-laurolactone. These two preferred lactones are diagramed as follows:

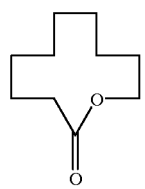

Structure I

Structure II

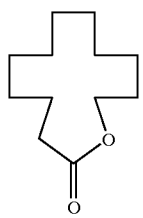

An ABA type polymer derived from the most preferred structure II λ-laurolactone block with butadiene derived block is diagramed as follows:

Structure III

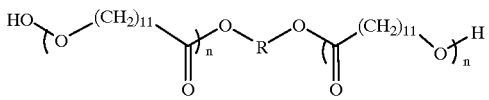

Thus it can be seen that the derived poly(lactones) in accordance with the invention are linear polyesters without carbon or heteroatom side chains. As earlier indicated, polymers derived from branched chain lactones such as 6-hydroxy dodecanoic acid lactone (ε-laurolactone), 6-hydroxy hexanoic acid lactone (ε-caprolactone) and 4-hydroxy dodecanoic acid lactone (λ-laurolactone), as well as unsubstituted lactones such as 6-hydroxy hexanoic acid lactone (epsilon or ε-caprolactone) are not acceptable.

To provide the requisite elasticity, relatively long chain poly(butadiene) blocks are incorporated in the block polymers. Poly (butadiene) blocks useful in accordance with the invention each have a molecular weight (Mw) in the range of between about 10,000 and about 100,000 and preferably between about 20,000 and about 50,000. The polydispersity of the poly(butadiene) blocks is preferably below about 1.6. The poly(lactone) blocks provide structure to the block copolymer, but do not contribute to elasticity. Accordingly, the total weight of the poly(lactone) blocks is less than that of the poly(butadiene) blocks, typically between about 10 and about 30 wt. percent of the poly(butadiene) blocks.

The type of polymer which forms depends upon the functionality of the block and the molar ratios of the blocks and linking compounds. The poly(lactones) can be mono or difunctional; typically the poly(butadiene) is also difunctional. To form an ABA polymer, a monofunctional poly(lactone), linker, and poly(butadiene) are reacted in approximately a 2:2:1 molar ratio. An $(AB)_n$ block copolymer will formed if a difunctional poly(lactone) is used and the molar ratio is approximately 1:(0.6–0.9):1. To form a $A_nB$ polymer, a multi-armed poly(butadiene) must be employed. ABA polymers may also be produced by polymerizing the poly(lactone) block from the ends of a difunctional HTPB.

To form high-energy compositions, particularly solid rocket propellants, which are generally a two phase system of binder and solids, the block polymer is mixed at processing temperature with solids, including fuel material particulates, e.g., aluminum, and oxidizer particulates, e.g., ammonium perchlorate (AP) cyclotetramethylene tetranitramine (HMX) and cyclotrimethylene trinitramine (RDX); and plasticizers. Then, the molten composition is cast, e.g., into a rocket motor casing, and the composition is allowed to cool. And in no case is chemical curing agents used.

Such high energy propellant formulations typically contain between about 70 to 91% solids, including oxidizer particulates and fuel material particulates, with the balance, i.e. about 9 to 30%, being a binder system including the block polymer and optionally plasticizer (all percentages by weight). The plasticizer can be dioctyladipate, mineral oil, silicon oil, β-Pinene, ACTIPOL E6 (registered trademark of AMOCO, Naperville, Ill.), KRYTOX (registered trademark of Dupont Co., Wilmington, Del.), ARNEEL (registered trademark of Akzo, Chicago, Ill.), or a mineral oil and poly (10-hydroxy dodecanoic acid) homopolymer mixture. Of these plasticizers, mineral oil or mineral oil in admixture with poly(10-hydroxy dodecanoic acid) homopolymer are preferred, with mineral oil most preferred. The preferred formulation contains about 85–91% solids and about 9–15% binder. The most preferred propellant mixture contains about 85% solids and about 15% binder, as indicated in examples 4 and 5 to follow. The solids are normally ammonium perchlorate and aluminum with the aluminum making up from 10–24% of the total propellant, preferably 13–18%, with ammonium perchlorate making up the balance of the solids. In examples 4 and 5, the aluminum is either 16 or 17%. of the total propellant weight. The solids are typically finely ground to allow good mixing and bonding with the binder. The aluminum used was 23μ average diameter with the ammonium perchlorate being a 3.06:1 ratio of 200μ and 20μ average particle sizes. These particle sizes and ratios are typical for a propellant of this type, although an infinite number of combinations would be useful as long as a reasonable distribution is maintained (i.e. some larger sized particles and some smaller sized particles). This mixture of particle sizes is needed to optimize particle packing for a good propellant density and mechanical properties and still have a low enough viscosity to process. The large particle sizes help with processing and the smaller with packing and properties. Plasticizer for the block polymer is typically employed at a ratio relative to thermoplastic copolymer (P1/Po) of between about 0.2 (1:5) and about 4.0 (4:1). The viscosity of the propellant at processing temperatures of 80–85° C. at the end of the mix cycles must be below 60 Kilopoise and preferably below 20 kilopoise.

The invention will now be described in greater detail by way of specific examples. Examples 1 and 3 relate to two different methods utilized for the preparation of ABA triblock materials while Example 2 relates to the synthesis of an $(AB)_n$ material. Examples 4 and 5 are illustrative of specific propellant formulations. It is significant to note that at no stage in the processing is the binder system chemically cured.

EXAMPLE 1

To a stirred solution of 13.0 9 (1.05 mmol) of a difunctional hydroxy-terminated polybutadiene with a molecular weight of 12,400 and 7.0 g (35.3 mmol) of λ-laurolactone in 25 ml of dry toluene were added 1.90 ml (2.09 mmol) of a 1.1 M solution of diethylzinc in toluene. The diethylzinc reacts with the hydroxyl end group of the butadiene polymer to form an intermediate zinc alkoxide-tipped polybutadiene which functions as an active initiating species. After the evolution of ethane gas subsided, the reaction mixture was heated to a gentle reflux for 24 hours, at which time NMR analysis showed that the λ-laurolactone had been converted to polymer. The polymer is isolated by precipitating in slightly acidic methanol followed by filtration. The resulting material was analyzed by GPC and compared with the starting butadiene polymer:

| Material | Mw | Mn | Mw/Mn |
|---|---|---|---|
| Polybutadiene | 33,600 | 21,600 | 1.56 |
| Product | 43,000 | 27,200 | 1.56 |

Differential scanning calorimetry of the product showed a melting point of 79° C. $^1$H NMR analysis showed that >90% of the polybutadiene hydroxyl end groups had functioned as initiators for λ-laurolactone polymerization.

EXAMPLE 2

To a stirred solution of 5.0 g (0.402 mmol) of a difunctional hydroxy-terminated polybutadiene with a molecular weight of 12,400 in 20 ml of dry $CH_2Cl_2$ were added 0.126 ml (0.886 mmol) of 2,4-toluenediisocyanate and 10 mg of diphenyltin dichloride. After 24 hours, $^1$H NMR analysis showed that essentially all polybutadiene hydroxyl end groups had reacted and FTIR analysis confirmed the presence of both isocyanate and urethane moieties. At this time, 2.58 g (0.403 mmol) of a difunctional hydroxy-terminated poly-λ-laurolactone were added to the reaction mixture. After 96 hours, further FTIR analysis shows that all isocyanate functionality had reacted. The material was concentrated to dryness to afford a product with a weight average molecular weight of 72,100. $^1$H NMR analysis suggested that a very high percentage of poly-λ-laurolactone hydroxyl end groups had reacted with isocyanate functionalities.

EXAMPLE 3

To a stirred solution of 2.0 g (0.38 mmol) of a monofunctional hydroxy-terminated poly-λ-laurolactone in 15 ml of dry $CH_2Cl_2$ were added 54 μl (0.38 mmol) of 2,4-toluenediisocyanate and 5 mg of diphenyltin dichloride. When $^1$H NMR analysis showed that essentially all poly-λ-laurolactone hydroxyl end groups had reacted and FTIR analysis confirmed the presence of isocyanate (the carbonyl stretch of the poly-λ-laurolactone obscures any urethane absorbance), 3.79 g (0.1993 mmol) of difunctional hydroxy-terminated polybutadiene with a molecular weight of 20,040 in 30 ml of dry $CH_2Cl_2$ were added. After all isocyanate functionality had reacted, the product was isolated by removal of volatiles under reduced pressure. The resulting material had an average molecular weight of 53,800. Small tensile samples were prepared and tested showing the material had a modulus of 360 psi, a true strain at maximum stress of 42% and an uncorrected maximum stress of 103 psi.

EXAMPLE 4

A sample of 15.0 g of an ABA poly(λ-laurolactone)-poly(butadiene)-poly(λ-laurolactone) material prepared according to the method of example 1 was heated to 190° F. for 10 minutes. To this material were added.20.0 g of 23μ average diameter aluminum powder and the mixture was stirred in ¼ pint vertical mixer for 5 minutes. To this mixture were added 24.5 g of 200μ average diameter ammonium perchlorate and the resulting mixture was stirred for 5 minutes. To this mixture were added 8.0 g of 20μ average particle size ammonium perchlorate and the resulting mixture was stirred for 10 minutes. The temperature of the mixture at this point was 160° F. To this mixture were added a further 24.5 g of 200μ average diameter ammonium perchlorate and the resulting mixture was stirred for 5 minutes then allowed to thermally soak for 15 minutes to warm to 190° F. To this mixture were added 6.0 g of 20μ average particle size ammonium perchlorate and the resulting mixture was stirred for 10 minutes. At this time, two small cartons of propellant were cast from the melted composition. Upon slow cooling a strong material was obtained. The end-of-mix viscosity for this propellant at 80° C. was 45 kilopoise.

EXAMPLE 5

A sample of 8.1 g of an ABA poly(λ-laurolactone)-poly(butadiene)-poly(λ-laurolactone) material prepared according to the method of example 3 was heated to 190° F. for 10 minutes along with 5.4 g of mineral oil as a plasticizer. To this material were added 18.0 g of 23μ average diameter aluminum powder and the mixture was stirred in ¼ pint vertical mixer for 5 minutes. To this mixture were added 22.0 g of 200μ average diameter ammonium perchlorate and the resulting mixture was stirred for 5 minutes. To this mixture were added 7.2 g of 20μ average particle size ammonium perchlorate and the resulting mixture was stirred for 10 minutes. To this mixture were added a further 22.1 g of 200μ average diameter ammonium perchlorate and the resulting mixture was stirred for 10 minutes. To this mixture were added 7.2 g of 20μ average particle size ammonium perchlorate and the resulting mixture was stirred for 15 minutes. At this time, two small cartons of propellant were cast from the melted composition. Upon slow cooling a strong material was obtained. The end-of-mix viscosity for this propellant at 80° C. was 25 kilopoise.

While the invention has been described in terms of certain preferred embodiments, modifications obvious to one with ordinary skill in the art may be made without departing from the scope of the present invention.

Various features of the invention are set forth in the following claims.

What is claimed is:

1. An uncured high-energy composition comprising between about 70 and about 91 weight percent of solid particulates, including particulates of fuel material and/or oxidizer particulates and between about 9 and about 30 weight percent of a binder system comprising a thermoplastic elastomeric block copolymer comprising at least one poly(butadiene) and at least one pair of poly(lactone) blocks flanking said poly(butadiene) block, wherein the weight of the poly(lactone) blocks is between about 10% and about 30% of the weight of the poly(butadiene) blocks, each of said poly(lactone) blocks being derived from lactones having between 8 and 18 carbon atoms in the lactone ring with no carbon or heteroatom substituent other than hydrogen on the ring, which composition is rigid below about 70° C. and processable in the temperature range of between about 70° C. and 120° C.

2. A composition according to claim 1 wherein the range of solid particulates lies between about 85 and about 91 wt. % solid particulates and between about 9 and about 15 wt. % binder.

3. A composition according to claim 2 wherein the formulation contains about 85 wt. % solid particulates and about 15 wt. % binder.

4. A composition according to claim 1 wherein each said lactone ring contains between 10 and 18 carbon atoms.

5. A composition according to claim 1 wherein each said lactone ring contains between 10 and 12 carbon atoms.

6. A composition according to claim 1 wherein said poly(lactone) blocks are derived from lactones of the group consisting of λ-laurolactone, 10-hydroxy decanoic acid lactone, and mixtures thereof.

7. A composition according to claim 1 wherein said poly(lactone) blocks are homopolymers of λ-laurolactone.

8. A composition according to claim 1 of the $(AB)_n$ type, wherein n=2–40.

9. A composition according to claim 1 of the ABA type.

10. A composition according to claim 1 wherein said poly(butadiene) blocks each have a Molecular weight of between about 10,000 and about 100,000 and the total weight of said poly(lactone) blocks is between about 10 and about 30 wt. percent of said poly(butadiene) blocks(s).

11. A composition according to claim 1 which is processable in the temperature range of between about 70° C. and about 100° C.

12. A composition according to claim 9 which is processable at a temperature of about 80° C.

13. A composition according to claim 1 further including a plasticizer.

14. A composition according to claim 13 wherein the plasticizer comprises mineral oil.

15. An uncured binder system for high energy compositions including a thermoplastic elastomeric block copolymer consisting essentially of at least one poly(butadiene) and at least one pair of poly(lactone) blocks flanking said poly(butadiene) block, wherein the weight of the poly(lactone) blocks is between about 10% and about 30% of the weight of the poly(butadiene) blocks, each of said poly(lactone) blocks being derived from lactones having between 8 and 18 carbon atoms in the lactone ring with no carbon or heteroatom substituents other than hydrogen on the ring, and wherein said block copolymer is rigid below about 70° C. and processable in the temperature range of between about 70° C. and about 120° C.

16. A binder system according to claim 15 wherein each said lactone ring contains between 10 and 18 carbon atoms.

17. A binder system according to claim 15 wherein each said lactone ring contains between 10 and 12 carbon atoms.

18. A binder system according to claim 15 wherein each of said lactone blocks are derived from lactones selected from the group consisting of λ-laurolactone, 10-hydroxy decanoic acid lactone, and mixtures thereof.

19. A binder system according to claim 15 wherein each of said lactones are homopolymers of λ-laurolactone.

20. A binder system according to claim 15 wherein said block copolymer is of the $(AB)_n$ type, wherein n=2–40.

21. A binder system according to claim 15 wherein said block copolymer is of the ABA type.

22. A binder system according to claim 15 wherein each butadiene block has a Mw of between about 10,000 and about 100,000 and the total weight of the lactone blocks is between about 10 and about 30 wt. % of the butadiene block(s).

23. A binder system according to claim 22 wherein the Mw of each butadiene block is between about 20,000 and about 50,000.

24. A binder system according to claim 15 wherein the block copolymer is processable in the temperature range of between about 70° C. and about 100° C.

25. A binder system according to claim 15 further including a plasticizer.

26. A binder system according to claim 25 wherein the plasticizer comprises mineral oil.

27. A thermoplastic elastomeric block copolymer comprising at least one poly(butadiene) and at least one pair of poly(lactone) blocks flanking said poly(butadiene) block, said poly(lactone) blocks derived from lactones having between 8 and 18 carbon atoms in the lactone ring with no carbon or heteroatom substituents other than hydrogen on the ring, and wherein said block copolymer is rigid below about 70° C. and processable in the temperature range of about 70° C. and 120° C., and wherein the total weight of the lactone blocks is between about 10% and about 30% of the butadiene blocks.

28. A block polymer according to claim 27 wherein each said lactone ring contains between 10 and 18 carbon atoms.

29. A block copolymer according to claim 27 wherein each said lactone ring contains between 10 and 12 carbon atoms.

30. A block copolymer according to claim 27 wherein said lactone blocks are derived from lactones selected from the group consisting of λ-laurolactone, 10-hydroxy decanoic acid lactone, and mixtures thereof.

31. A block copolymer according to claim 27 wherein said lactones are homopolymers of λ-laurolactone.

32. A block copolymer according to claim 27 of the $(AB)_n$ type, wherein n=2–40.

33. A block copolymer according to claim 27 of the ABA type.

34. A block copolymer according to claim 27 wherein each butadiene block has a Mw of between about 10,000 and about 100,000.

35. A block copolymer according to claim 34 wherein the Mw of each butadiene block is between about 20,000 and about 50,000.

36. A block copolymer according to claim 27 which is processable in the temperature range of between about 70° C. and 100° C.

37. A block copolymer according to claim 27 which is processable at a temperature of about 80° C.

* * * * *